April 25, 1939.  R. DREVERHOFF  2,155,857

CRANKSHAFT LATHE

Filed March 1, 1938

INVENTOR:
Rudolf Dreverhoff

Patented Apr. 25, 1939

2,155,857

UNITED STATES PATENT OFFICE 2,155,857

CRANKSHAFT LATHE

Rudolf Dreverhoff, Cincinnati, Ohio

Application March 1, 1938, Serial No. 193,243

4 Claims. (Cl. 82—9)

The present invention relates to improvements in the class of crankshaft lathes where the tool moves in accordance with the movement of crankpins.

The object of the invention is the provision of a mechanism for holding the toolholder in a steady parallel to itself swinging position, while the synchronizing movement of the tool to the crank pin is produced by only one eccentric or eccentric shaft.

The mechanism for holding the toolsupport in a parallel to itself swinging position is the provision of two (or more) parallelograms which are movably connected together by one of their legs to a link, forming a joint, while one of the opposite legs forms the movable connection points against a fixed point, bracket or wall, the other one against the toolholder.

Another object is the provision of an arrangement for feeding the tool or a plurality of tools simultaneously in horizontal direction against the workpiece.

The invention is further explained in the course of the following description, in the appended claims and by the accompanying drawing in which:

The present invention serves for simplifying the mechanism for the movement of the toolholder, for increasing the precision, and the avoidance of marks on the pin, which are usually caused by the application of several eccentrics or eccentric shafts for holding the toolholder in position, or the marks are caused by a to and fro sliding toolholder carriage which at the moment of reversal of its movement produced a reaction of the forces and causes fluctuations on the tool.

Figure 1:
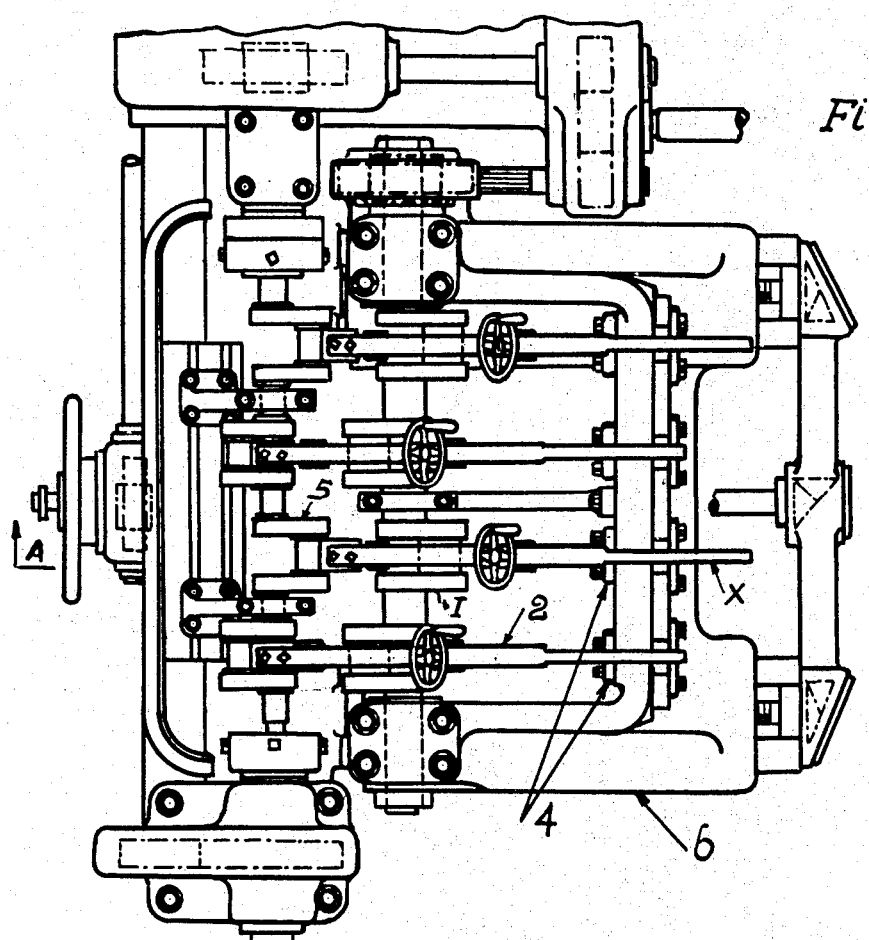
Fig. 1 is a top view of a crankshaft lathe embodying the present invention.
Figure 2:
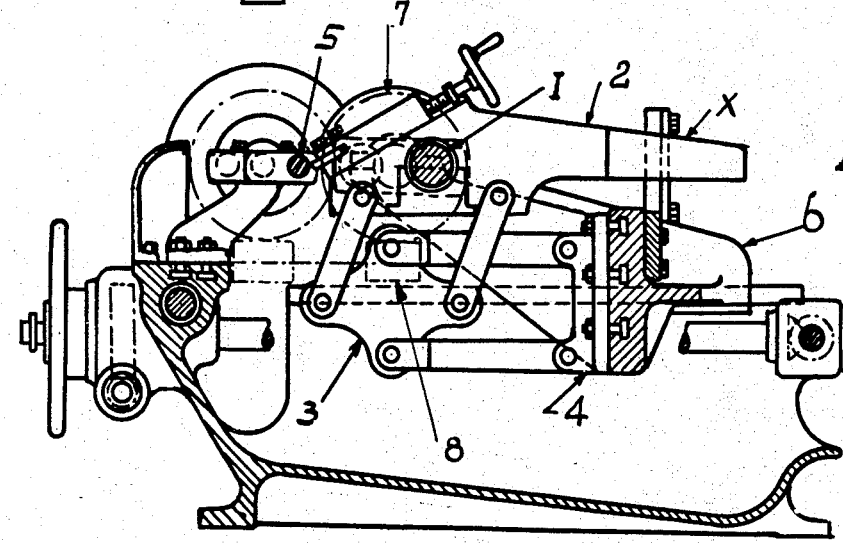
Fig. 2 is a section of it taken on line A—A and shows the principle of the invention.

In the drawing Fig. 2 is clearly indicated the simple arrangement of the toolholder movement which represents the principle of the invention.

There is only one eccentric or eccentric shaft applied, and for holding the toolholder or toolholders in a parallel to itself swinging position, two parallelograms are provided and movably connected with one of their legs against a link, forming a joint, while one of the opposite legs is movably connected against a fixed point (bracket or wall) and the other opposite leg linked with the toolholder.

This parallelogram connection between toolholder and fixed point represents a positive support for the swinging toolholder and holding it in a parallel to itself swinging position according the character of parallelograms.

The form or construction of each parallelogram may be any one which is equivalent to the character of parallelograms.

The arrangement of the connection between toolholder and fixed point by the said parallelograms will have no effect for producing a reaction at the moment of the reversal of the movement of the eccentric. (Dead point.)

This arrangement offers a greater precision work for finishing pins when turning, milling or grinding.

The drawing shows a crankshaft lathe for machining a plurality of pins at the same time.

One eccentric shaft 1 carries the toolholders 2, each of said toolholders is held in position by two parallelograms linked movably together by one of their legs against a link 3, and one of the opposite legs of said legs is connected against a fixed point or bracket 4, the other one against the toolholder 2.

The eccentric shaft 1 rotates in timed relation with the workpiece 5, both being driven here by a separated wormgear and worm and receiving the motion from the driving gear box.

The support 6 carries the eccentric shaft 1 with the toolholders 2 and the means for holding them in position, the wormgear 7 on the eccentric shaft and worm 8 which slides on a driving shaft and moves with the support 6 in horizontal direction against the workpiece.

The support 6 is fed by means connecting the main spindle and driven by hand or power for advancing all tools at the same time.

Of course, the kind of gear systems of the connecting means between workpiece and eccentric shaft for rotating them in unison could be any other one as that shown in the drawing, there could be applied bevel- or spur-gear drive, and so provided, that the pinion of the gear system on the eccentric shaft is slidable on its driving shaft for being able to follow the movement of the support toward the workpiece, whereas said support slides direct on the bed in said direction or on a bedslide which is slidable along the workpiece.

The toolholders 2 have a prolongation "X" which slides in slots or bearings for holding the tool in a right angle position to the workpiece.

The toolholder 2 is provided with a toolslide for setting the tool.

What I claim is:

1. A machine of the character described comprising means for supporting and rotating the work or crankshaft to be turned, a master eccentric, connections between said master eccentric and the work supporting and driving means for rotating them in unison, means for supporting said master eccentric, a tool holder carried by said master eccentric, a tool adjustably attached to said toolholder for engaging the eccentrically rotating pin of said crankshaft to be turned, two parallelograms for causing said toolholder to swing parallel to itself and synchronously to the pin of said crankshaft to be turned, a link for joining said two parallelograms together like a chain whose one free end is pivotally connected against said toolholder, the other free end pivotally connected against a fixed point located between or outside of the machine, connecting points of said free end against said toolholder forming the opposite leg of the leg connected against said link of the parallelogram connecting said toolholder with said link, connecting points of the other free end against said fixed point forming the opposite leg of the leg connected against said link of the parallelogram connecting said link with said fixed point, so that the leg connected against said fixed point causes by means of said two parallelograms to carry over its permanent position to said toolholder holding it in a parallel to itself swinging position.

2. A machine of the character described comprising means for supporting and rotating the work or crankshaft to be turned, a master eccentric, connections between said master eccentric and the work supporting and driving means for rotating them in unison, means for supporting said master eccentric, a toolholder carried by said master eccentric, a tool adjustably attached to said toolholder for engaging the eccentrically rotating pin of said crankshaft to be turned, two parallelograms for causing said toolholder to swing parallel to itself and synchronously to the pin of said crankshaft to be turned, a link for joining said two parallelograms together like a chain whose one free end is pivotally connected against said toolholder, the other free end pivotally connected against a fixed point located between or outside of the machine, connecting points of said free end against said toolholder forming the opposite leg to the leg connected against said link of the parallelogram connecting said toolholder with said link, connecting points of the other free end against said fixed point forming the opposite leg to the leg connected against said link of the parallelogram connecting said link with said fixed point, so that the leg connected against said fixed point causes by means of said two parallelograms to carry over its permanent position to said toolholder holding it in a parallel to itself swinging position, a support slidably mounted on the bed carrying said master-eccentric and toolholder to feed together toward said crankshaft to be turned, feed mechanism to drive said support by hand or by power in direction toward said crankshaft to be turned, said tool adjustably attached to said toolholder swinging synchronized to said eccentrically rotating pin of said crankshaft to be turned, and following simultaneously the movement of said support to feed toward said eccentrically rotating pin, so that said movement of said support determines the turning diameter of said eccentrically rotating pin of said crankshaft to be turned, a gear-system of said connections between said master-eccentric and the work supporting and driving means for rotating them in unison mounted rotatably on said support to drive said master eccentric, a pinion of said gear system slidably keyed on its driving shaft to follow the movement of said support toward said crankshaft to be turned.

3. A machine of the character described comprising means for supporting and rotating the work or crankshaft to be turned, a master eccentric, connections between said master eccentric and the work supporting and driving means for rotating them in unison, a toolholder carried by said master eccentric, a tool, a toolslide mounted slidably on said toolholder for setting said tool engaging the eccentrically rotating pin of said crankshaft to be turned, two parallelograms for causing said toolholder to swing parallel to itself and synchronously to said pin of said crankshaft to be turned, said two parallelograms joined together by connecting one leg of one parallelogram against one leg of the other parallelogram to form a chain whose one free end connected pivotally against said toolholder the other free end pivotally connected against a fixed point located between or outside of the machine, connecting points of said free end of said one parallelogram connected against said toolholder forming the opposite leg of the leg connected against said leg of the other parallelogram, connecting points of said other free end of said other parallelogram connected against said fixed point forming the opposite leg of the leg connected against said leg of said parallelogram connecting said toolholder, so that the leg connected against said fixed point causes by means of said two parallelograms to carry over its permanent position to said toolholder holding it in a parallel to itself swinging position, a prolongation extending said toolholder in opposite direction of said tool and backwards of said master eccentric, an adjustable bearing, slot like, located in the rear of said prolongation for guiding said toolholder in a right angle position to said crankshaft, a bedslide mounted on the bed for moving along said crankshaft to be turned, a support slidably mounted on said bedslide for carrying said master eccentric and toolholder to feed together toward said crankshaft to be turned, feed mechanism for driving said support by hand or by power in direction toward said crankshaft to be turned, said tool adjustably attached on said toolslide swinging synchronized to said eccentrically rotating pin of said crankshaft to be turned, and following simultaneously the movement of said support to feed toward said eccentrically rotating pin so that said movement of said support determines the turning diameter of said eccentrically rotating pin of said crankshaft to be turned, a gear system of said connections between said master eccentric and the work supporting and driving means for rotating them in unison mounted rotatably on said support to drive said master eccentric, a pinion of said gear system slidably keyed on its driving shaft to follow the movement of said support toward said crankshaft to be turned, a second gear system of said connections between said master eccentric and the work supporting and driving means for rotating them in unison mounted rotatably on said bedslide, the pinion of said second gear system slidably keyed on its driving shaft to follow the movement of said bedslide in direction along said crankshaft to be turned.

4. A machine of the character described comprising means for supporting and rotating the work or crankshaft to be turned, a master crankshaft with a number of eccentrics according to the number of pins of said crankshaft to be turned, connections between said master crankshaft and the work supporting and driving means for rotating them in unison, a number of toolholders, each of said toolholders carried by one of said eccentrics of said master crankshaft, a toolslide mounted on each of said toolholders, tools adjustably attached to each toolslide, said toolslides for setting said tools engaging the eccentrically rotating pins of said crankshaft to be turned, two parallelograms, a link, and a fixed point for each of said toolholders, said two parallelograms for causing the toolholder to swing parallel to itself and synchronously to the pin to be turned, said link for joining said two parallelograms together, like a chain, whose one free end is pivotally connected against the toolholder, the other free end pivotally connected against the fixed point located between or outside of the machine, the connecting points for said free end against the toolholder forming the opposite leg to the leg connected against said link of the parallelogram connecting the toolholder with said link, the connecting points of the other free end against said fixed point forming the opposite leg to the leg connected against said link of the parallelogram connecting said link with said fixed point, so that the leg connected against the fixed point causes by means of said two parallelograms to carry over its permanent position to the toolholder holding it in a parallel to itself swinging position, a prolongation for each of said toolholders in opposite direction of said tools and backwards of said master crankshaft, an adjustable bearing, slot like, for the prolongation of each of said toolholders for holding them in a right angle position to the crankshaft to be turned, a bedslide mounted on the bed for moving along said crankshaft, a support slidably mounted on said bedslide for carrying said master crankshaft and tool holders to feed together toward said crankshaft to be turned, feed mechanism for driving said bedslide by hand or by power in direction along said crankshaft to be turned, feed mechanism for driving said support by hand or by power in direction toward said crankshaft to be turned, said tools swinging synchronized to the eccentrically rotating pins to be turned following simultaneously the movement of said support to feed toward said eccentrically rotating pins of the crankshaft to be turned, so that the movement of said support determines the turning diameters of said eccentrically rotating pins of the crankshaft to be turned, a gear system of said connections between said master crankshaft and the work supporting and driving means for rotating them in unison mounted rotatably on said support to drive said master crankshaft, a pinion to said gear system slidably keyed on its driving shaft for following the movement of said support toward said crankshaft to be turned, a second gear system of said connections between said master crankshaft and the work supporting and driving means for rotating them in unison mounted rotatably on said bedslide, the pinion of said second gear system slidably keyed on its driving shaft for following the movement of said bedslide in direction along said crankshaft to be turned.

RUDOLF DREVERHOFF.